Jan. 22, 1924.
C. E. TANNEWITZ
1,481,569
TRIMMING SAW
Filed April 11, 1921   2 Sheets-Sheet 1
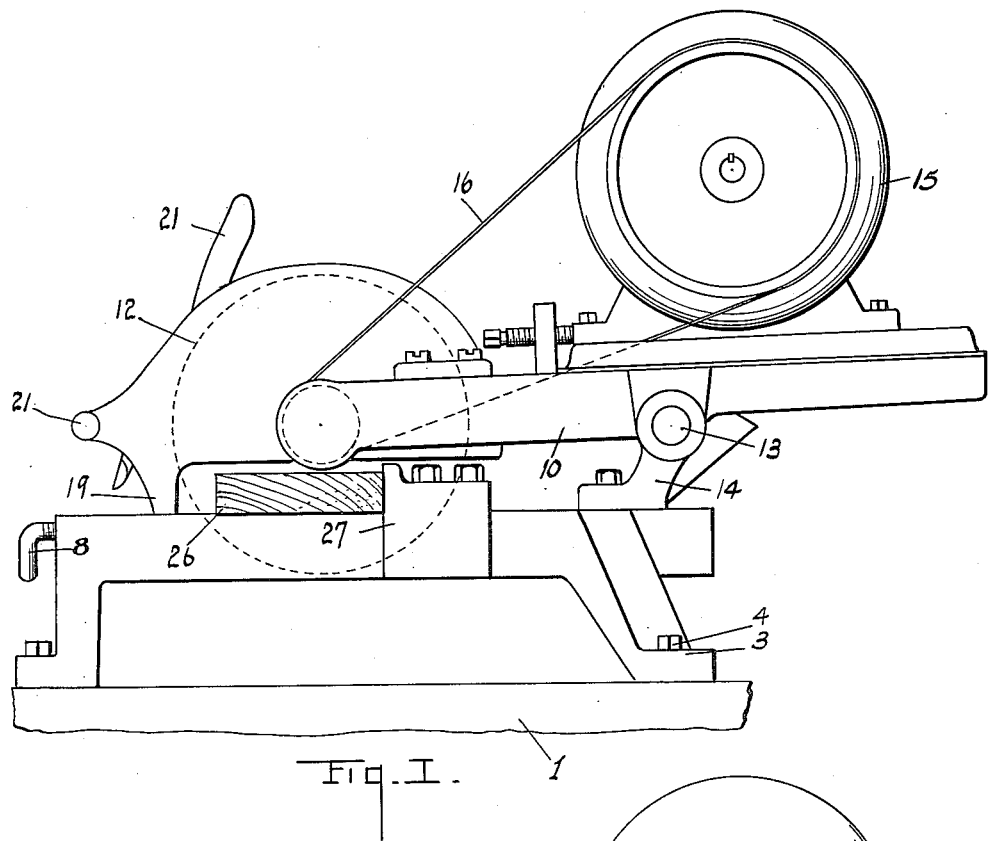
Fig. I.
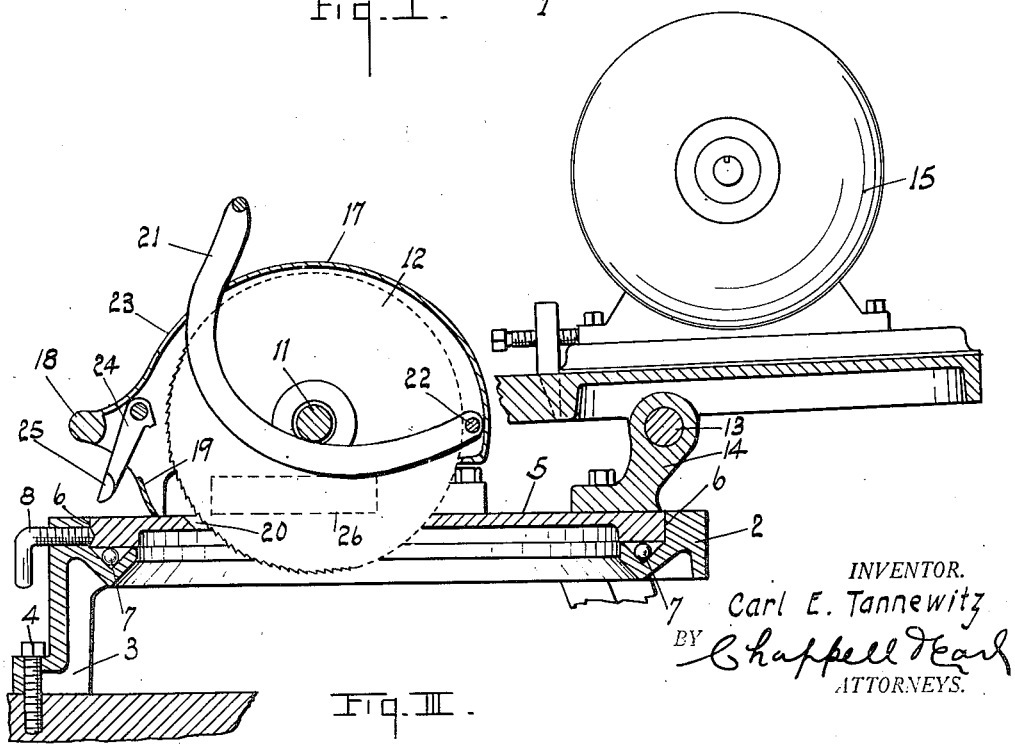
Fig. II.
INVENTOR.
Carl E. Tannewitz
BY Chappell & Earl
ATTORNEYS.

Jan. 22, 1924. 1,481,569
C. E. TANNEWITZ
TRIMMING SAW
Filed April 11, 1921 2 Sheets-Sheet 2
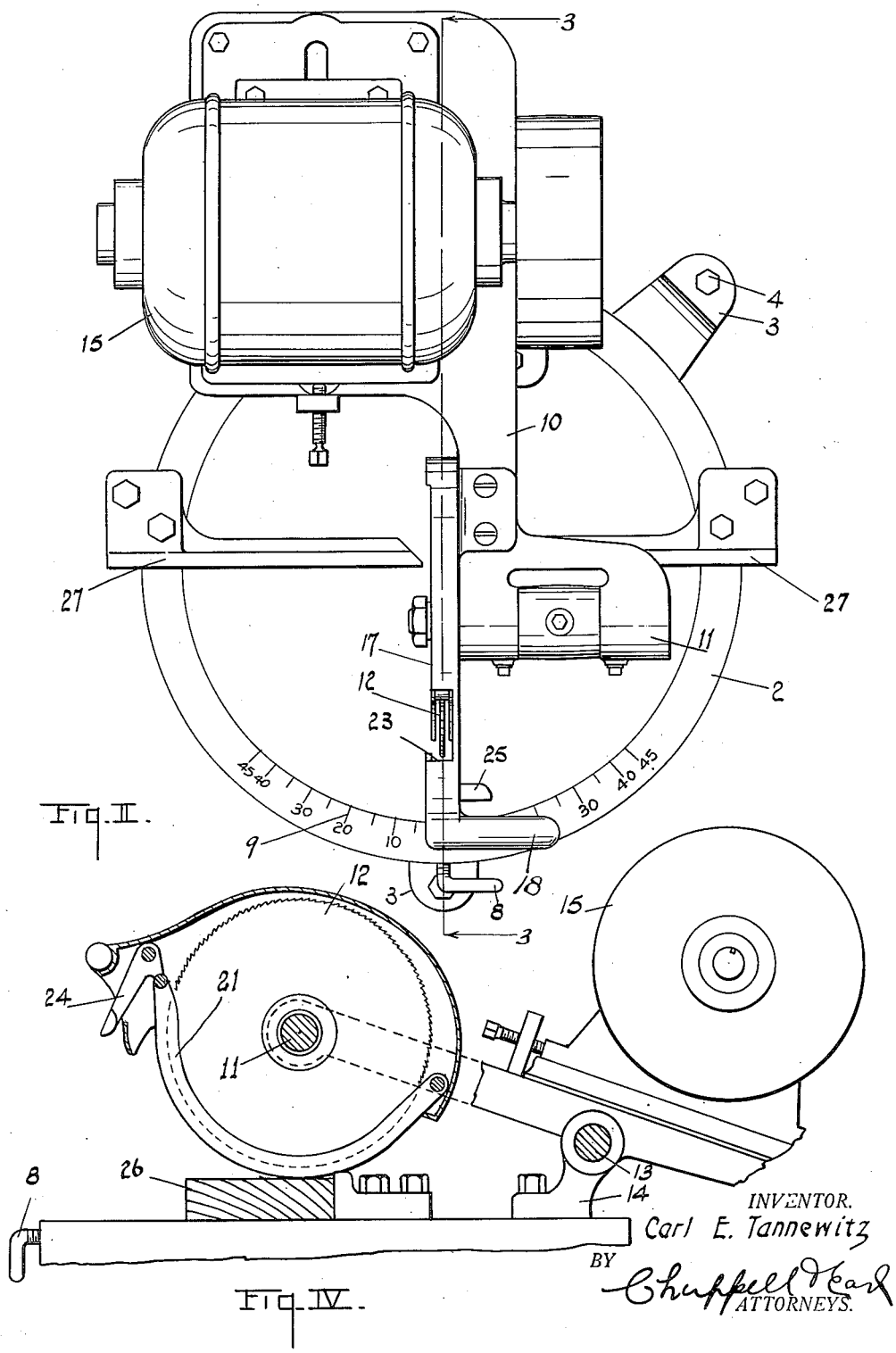
INVENTOR.
Carl E. Tannewitz
BY
Chappell Earl
ATTORNEYS.

Patented Jan. 22, 1924.

1,481,569

UNITED STATES PATENT OFFICE.

CARL E. TANNEWITZ, OF GRAND RAPIDS, MICHIGAN, ASSIGNOR TO THE TANNEWITZ WORKS, OF GRAND RAPIDS, MICHIGAN.

TRIMMING SAW.

Application filed April 11, 1921. Serial No. 460,321.

*To all whom it may concern:*

Be it known that I, CARL E. TANNEWITZ, a citizen of the United States, residing at Grand Rapids, county of Kent, State of Michigan, have invented certain new and useful Improvements in Trimming Saws, of which the following is a specification.

This invention relates to improvements in trimming saws.

The main objects of this invention are:

First, to provide an improved trimming saw or sawing machine adapted for trimming and mitering which is compact and simple in structure and very convenient to use.

Second, to provide an improved sawing machine for trimming and mitering which may be quickly adjusted to and from the work and may be quickly adjusted to cut at different angles.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side elevation of a sawing machine embodying the features of my invention, the bench or support on which the machine is mounted being partially broken away.

Fig. II is a plan view.

Fig. III is a detail view mainly in vertical section on a line corresponding to line 3—3 of Fig. II.

Fig. IV is a detail vertical section corresponding to that of Fig. III showing the saw guard in operative position and supporting the saw above a piece of work.

In the drawing similar reference characters refer to similar parts throughout the several views.

Referring to the drawing, 1 represents a work bench or other support on which my improved sawing machine is mounted.

The bed 2 of the machine is provided with legs 3 adapted to receive bolts 4 for securing the bed 2 to the bench.

The saw table 5 is rotatably mounted in the bed, the bed being provided with an annular bearing 6 having bearing balls 7 by which the table is supported.

A screw 8 is provided for locking the table in its adjusted positions, the bed being provided with gage indicia 9 so that the angle at which the cut is to be made may be determined.

I provide a saw frame 10 carrying the arbor 11 for the saw 12. This frame is pivoted at 13 on a bracket 14 carried by the saw table so that the saw frame may be tilted to swing the saw to and from the work and to feed it to the work.

An electric motor 15 is mounted on the rear end of this saw frame, it being connected to the saw arbor by means of the belt 16. A housing 17 is provided for the saw, the housing being mounted on the front end of the saw frame and provided with a handle 18 for manipulation of the saw.

The housing is provided with a stop 19 coacting with the table,—see Figs. I and III. The saw table is provided with a saw slot 20.

I provide a curved saw guard 21, the guard being pivoted at 22 within the housing and adapted to swing through an opening 23 in the front of the housing when the saw is lowered,—see position in Fig. III.

A catch 24 is provided adapted to automatically engage the guard when the guard is in operative position, the guard falling to operative position when the front end of the saw frame is lifted.

This catch is provided with a finger-piece 25 projecting downwardly from the housing in position to be conveniently released by the operator.

In Fig. I, I show a piece of work 26 disposed against the work rests 27, which are mounted on the bed to project across the table.

With the parts thus arranged, I am able to adjust the saw to various angles, the saw illustrated being adapted to cut up to 45° in either direction from its central position. The saw is designed for light work and is well adapted to be mounted on a bench or on a small standard or support near the bench, so that it may be used in lieu of a hand saw, it being much more rapid and quite as convenient for ordinary work.

Having thus described my invention, what I claim as new and desire to secure by Letters Patent, is:

1. In a sawing machine, the combination with a bed, of a table, a saw frame pivotally mounted on said table, a saw mounted on the front end of said frame, a saw driving motor mounted on the rear end of said frame, a saw housing mounted on the front end of said frame, said housing being provided with a handle, a saw guard pivoted at its rear end within said housing and adapted when in its operative position to support the frame and guard the saw, and an automatic catch for locking said guard in its operative position, said housing being provided with a stop coacting with said table to limit the downward swing of the saw.

2. In a sawing machine, the combination with a bed, of a table, a work rest on said bed, a saw frame pivotally mounted on said table, a saw mounted on the front end of said frame, a saw driving motor mounted on the rear end of said frame, a saw housing mounted on the front end of said frame, a saw guard pivoted at its rear end within said frame and adapted when in its operative position to support the frame and guard the saw, and a catch for locking said guard in its operative position.

In witness whereof I have hereunto set my hand and seal in the presence of two witnesses.

CARL E. TANNEWITZ. [L. S.]

Witnesses:
OLIVER DE GROOT,
J. PETER DIRKSE.